Oct. 19, 1926.
H. MAGER
1,604,058
ARRANGEMENT FOR ROASTING, GRINDING, AND COOKING COFFEE OR THE LIKE
Filed July 8, 1925
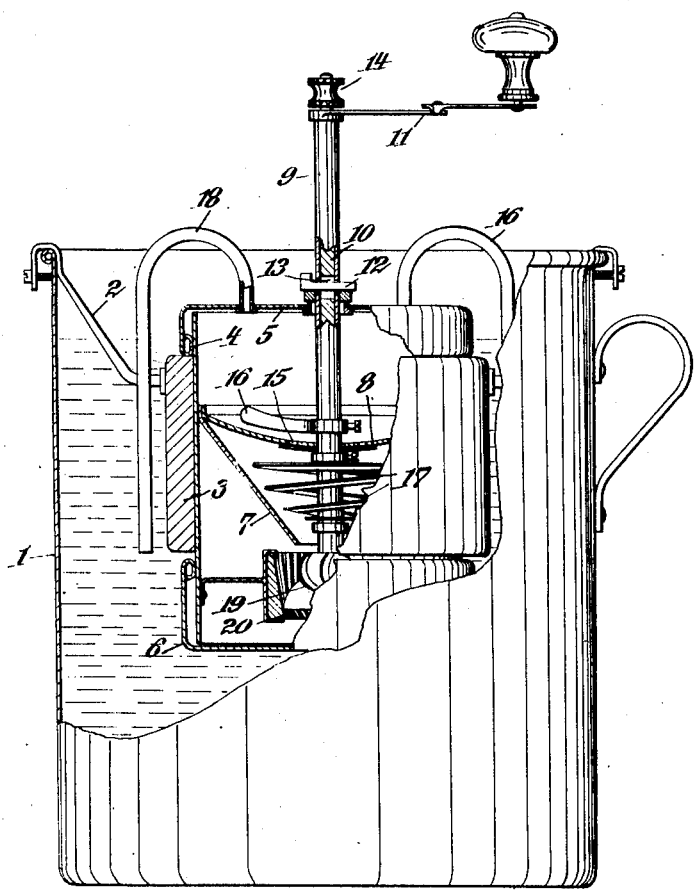
INVENTOR
Herbert Mager
BY Munn & Co
ATTORNEYS Patented Oct. 19, 1926.

1,604,058

UNITED STATES PATENT OFFICE.

HERBERT MAGER, OF VIENNA, AUSTRIA.

ARRANGEMENT FOR ROASTING, GRINDING, AND COOKING COFFEE OR THE LIKE.

Application filed July 8, 1925, Serial No. 42,271, and in Austria May 26, 1924.

This invention relates to an apparatus for roasting, grinding and cooking coffee or the line.

The apparatus according to the present invention is heated by electricity, the green coffee-beans are roasted, the roasting fumes of which are utilized, subsequently the roasted beans are ground and finally the coffee is made.

However apparatus for roasting and grinding coffee-beans and apparatus for making coffee from green beans are already known. It is also known to pass into water the gases and vapours, produced during the roasting operation, in order to extract the elements contained therein.

The essential feature of apparatus according to the present invention consists in that a cylindrically shaped device, containing a space for storing the green beans, a roasting and grinding device and a receptacle for the ground coffee, is surrounded intermediate of the ends of the roasting device by an annular electric heating member, which can be secured to a cooking vessel for the reception of the coffee by means of supporting members, so that the heating member radiates outwardly a part of the heat in order to heat the water and also radiates inwardly the other part of the heat for roasting the beans.

The apparatus is formed in such a manner, that the gases or vapours generated during the roasting operation of the beans pass through curved pipes into the water, so that the aromatic and other volatile elements are taken up by the same and thus improve the taste or flavour of the produced coffee-water.

One mode of carrying out the present invention is illustrated in section and by way of example on the accompanying drawing.

An annular electric heating resistance 3, which is properly encased so as to be water-tight, is secured to a cooking vessel 1 of suitable size by means of supporting arms 2 adapted to be fixed to the vessel with the aid of screws or the like, the current carrying means passing through tubes (not illustrated) which terminate above the level of the water contained in the vessel. The heating member is in the shape of a smooth ring, and a cylindrical or tubular member 4 carrying the coffee-roasting and grinding device is disposed in the said ring. The top of this tubular member is closed by a tightly fitting lid 5, while the bottom of the said member is closed by a tightly fitting bottom 6 for the reception of the ground coffee. An inverted conically shaped member 7 is disposed within the tubular member 4 and closed at the top by a cup-shaped partition 8. An axially disposed, rotatable tube 9 passes through the conical member, and a shaft 10 is arranged within the former and can be rotated by means of a handle 11. With the aid of a key or wedge 12, resting on the top of a sleeve attached to the lid 5 and passing through the shaft 10 and tube 9, the latter is rotated when the shaft 10 is operated by means of the handle 11. The key-hole 13 in the shaft is larger than the key 12, so that the said shaft can be shifted axially with respect to the tube if the nut 14, provided at the top end of the shaft, is tightened.

The green coffee-beans are filled into the space above the cup-shaped partition 8, hereafter the entire cylindrical member is placed into the annular heating resistance 3 and the lid 5 is applied, and now the resistance 3 is secured in the cooking vessel 1 and the electric current is switched on. The heating resistance or ring 3 gives up or radiates a part of its heat outwardly and part of it inwardly.

The conditions are such, that as soon as the water starts to boil also the interior of the roasting device has been heated up at a corresponding temperature (about 350 degrees Celsius). On rotating the handle 11, the arm or pusher 16, secured to the tube 9 above the bottom of the cup-shaped member 8, pushes the beans through the openings 15 in the member 8, so that the beans drop one by one onto the helical member or path 17, formed of sheet-copper or any other good heat-conducting material and also fixed to the tube 9 and rotating with it. The beans, which are already partly roasted, are quickly roasted by the helical member 17 and the conical member 7. The generated aromatic vapours and volatile alkaloids pass through curved tubes 18, attached to the lid 5, into the coffee-water and considerably improve the aroma of the latter. The roasted beans drop onto the mill, which comprises a coarse or pre-grinding member 19 and a fine grinding member 20. The degree of grinding can be adjusted by tightening or loosening the nut 14 when the grinding members will be raised or lowered. The cylindrical member 4 is pulled out, if all beans have passed through the roasting device and ground in the mill. Thereby the cup-shaped bottom 6 is stripped off and together with the ground coffee-beans drops into the boiling water, thereby completing the coffee.

I claim:—

1. An electrically heated apparatus for roasting, grinding and cooking coffee or the like, comprising a casing, a chamber in the latter for the green beans, a roasting device in the casing underneath the said chamber, a grinding device in the casing underneath the roasting device, a receptacle underneath the grinding device for collecting the ground beans, an electric heating member surrounding the said casing, and supporting members attached to the said heating member and provided with means for attachment to a vessel for boiling water.

2. An electrically heated apparatus for roasting, grinding and cooking coffee or the like, comprising a vessel for boiling water, a casing, a chamber in the latter for the green beans, a roasting device in the casing underneath the said chamber, a grinding device in the casing underneath the roasting device, a receptacle underneath the grinding device for collecting the ground beans, an electric heating member surrounding the said casing and supporting members attached to the said heating member for securing the casing within the said vessel by attaching the supporting members to the vessel, and a curved pipe secured to the casing and establishing communication between the interior of the latter and the vessel for boiling water.

3. An electrically heated apparatus for roasting, grinding and cooking coffee or the like, comprising a vessel for boiling water, a casing, a chamber in the latter for the green beans, a roasting device in the casing underneath the said chamber, the said roasting device consisting of an inverted conically shaped member and of a helical member of a good heat-conducting material, a grinding device in the casing underneath the roasting device, a receptacle underneath the grinding device for collecting the ground beans, means passing through the said casing for rotating the helical member and grinding device, an electric heating member surrounding the said casing, supporting members attached to the said heating members for securing the casing to the said vessel within the latter.

4. An electrically heated apparatus for roasting, grinding and cooking coffee or the like, comprising a vessel for boiling water, a casing, a chamber in the latter for the green beans a roasting device in the casing underneath the said chamber, the said roasting device consisting of an inverted conically shaped member and a helical member of a good heat-conducting material, a grinding device in the casing underneath the roasting device, a receptacle underneath the grinding device for collecting the ground beans, means passing through the said casing for rotating the helical member and grinding device, a pusher secured to the rotary means within the said chamber, an electric heating member surrounding the said casing, supporting members attached to the said heating member for securing the casing to the said vessel within the latter.

5. An electrically heated apparatus for roasting, grinding and cooking coffee or the like, comprising a vessel for boiling water, a casing, a chamber in the latter for the green beans, a roasting device in the casing underneath the said chamber, the said roasting device consisting of an inverted conically shaped member and of a helical member of a good heat-conducting material, a grinding device in the casing underneath the roasting device, a receptacle underneath the grinding device for collecting the ground beans, a shaft passing through the casing to which the grinding device is secured, a tube round the shaft to which the said helical member is secured, means for coupling together the shaft and helical member in such a way that these two parts can be adjusted with respect to each other, means secured to the shaft for rotating the latter together with the helical member, an electric heating member surrounding the said casing, supporting members attached to the said heating member for securing the casing to the said vessel within the latter.

6. An electrically heated apparatus for roasting, grinding and cooking coffee or the like, comprising a vessel for boiling water, a casing, a chamber in the latter for the green beans, a roasting device in the casing underneath the said chamber, the said roasting device consisting of an inverted conically shaped member and of a helical member of a good heat-conducting material, a grinding device in the casing underneath the roasting device, the said grinding device comprising a coarse grinding member and a fine grinding member, a receptacle underneath the grinding device for collecting the ground beans, means passing through the said casing for rotating the helical member and grinding device, an electric heating member surrounding the said casing, supporting members attached to the said heating member for securing the casing to the said vessel within the latter.

7. An electrically heated apparatus for roasting, grinding and cooking coffee or the like, comprising a casing, a chamber in the latter for the green beans, a roasting device in the casing underneath the said chamber, a grinding device in the casing underneath the roasting device, a receptacle underneath the grinding device for collecting the ground beans and forming a removable bottom of the said casing, an electric heating member surrounding the said casing intermediate of the ends thereof, and supporting members attached to the said heating member for attachment to a vessel for boiling water, the said receptacle being adapted to cooperate with the heating member and to be stripped off the casing by the heating member.

8. In an electrically heated apparatus of the character described, a water receptacle, a casing suspended in the receptacle, a roasting chamber in the casing, and an electric heating member surrounding the casing opposite the roasting chamber, whereby the water of the receptacle and the roasting chamber of the casing will be heated.

9. In an electrically heated apparatus of the character described, a water receptacle, a casing suspended in the receptacle, an inverted conical chamber in the casing and having an open lower end, a cup-shaped closure for the conical member provided with openings, a rotary helical member in the conical chamber, and an electric heating member surrounding the casing.

10. In an electrically heated apparatus of the character described, a casing, an inverted conical chamber in the casing and having an open lower end, a rotatable shaft mounted in the casing and chamber and provided with a handle, a helical member on the shaft in the conical chamber, an electric heating member surrounding the casing and serving to heat the conical chamber and the helical member, and a grinding device in the casing below the conical chamber, one member of the grinding device being mounted on the said shaft.

11. In an electrically heated apparatus of the character described, a casing, an inverted conical chamber in the casing and having an open lower end, and a dished-shaped apertured top, a shaft mounted in the casing and top of the chamber and provided with a handle, a helical member on the shaft in said chamber, an arm on the shaft above the top of said chamber, a grinding device below the conical chamber, one member of which is carried by the said shaft and an electrically heating member on said casing.

In testimony whereof I affix my signature.

HERBERT MAGER.